United States Patent
Agarwal et al.

(10) Patent No.: US 8,761,399 B2
(45) Date of Patent: Jun. 24, 2014

(54) KEYSTORE MANAGEMENT SYSTEM

(71) Applicant: Oracle International Corporation, Redwood Shores, CA (US)

(72) Inventors: Amit Agarwal, Sunnyvale, CA (US); Srikant Krishnapuram Tirumalai, Milpitas, CA (US); Krishnakumar Sriramadhesikan, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/655,535

(22) Filed: Oct. 19, 2012

(65) Prior Publication Data

US 2014/0112477 A1    Apr. 24, 2014

(51) Int. Cl.
  *H04L 29/06* (2006.01)
  *H04L 9/08* (2006.01)

(52) U.S. Cl.
  CPC .............. *H04L 9/083* (2013.01); *H04L 9/0894* (2013.01)
  USPC ............................ 380/277; 380/286; 707/782

(58) Field of Classification Search
  CPC ................................ H04L 9/083; H04L 9/0894
  USPC ...................................... 380/277, 286; 707/782
  See application file for complete search history.

(56) References Cited

U.S. PATENT DOCUMENTS

| | | | |
|---|---|---|---|
| 6,243,816 B1 | 6/2001 | Fang et al. | |
| 6,839,437 B1 * | 1/2005 | Crane et al. | 380/286 |
| 7,096,355 B1 | 8/2006 | Marvit et al. | |
| 7,549,174 B1 | 6/2009 | Falkner et al. | |
| 7,805,755 B2 | 9/2010 | Brown et al. | |
| 7,823,190 B1 | 10/2010 | Kacarov et al. | |
| 2002/0080975 A1 * | 6/2002 | Rich et al. | 380/286 |
| 2002/0083178 A1 * | 6/2002 | Brothers | 709/226 |
| 2004/0117655 A1 | 6/2004 | Someshwar | |
| 2008/0123855 A1 * | 5/2008 | Thomas | 380/277 |
| 2008/0133905 A1 | 6/2008 | Challener et al. | |
| 2008/0273706 A1 | 11/2008 | Noll | |

(Continued)

FOREIGN PATENT DOCUMENTS

| | | |
|---|---|---|
| EP | 0752635 B1 | 9/2001 |
| EP | 1380916 A1 | 1/2004 |

(Continued)

OTHER PUBLICATIONS

A. Cilardo et al., "An FPGA-based Key-Store for Improving the Dependability of Security Services", University of Naples Federico II, http://citeseerx.ist.psu.edu/viewdoc/summary?doi=10.1.1.59.5775 (last visited on Nov. 6, 2012).

(Continued)

*Primary Examiner* — Michael Pyzocha
(74) *Attorney, Agent, or Firm* — Miles & Stockbridge P.C.

(57) ABSTRACT

A keystore management system is provided that manages a keystore. The keystore management system creates a mapping of a plurality of keystore identity parameters to a plurality of keystore repository parameters. The keystore identity parameters identify the keystore. The keystore repository parameters identify a repository that stores the keystore. The keystore is a storage entity stored on the repository. The keystore management system further stores the mapping within a configuration file. The keystore management system further translates the keystore identity parameters into the keystore repository parameters based on the mapping stored within the configuration file.

20 Claims, 6 Drawing Sheets

(56) References Cited

U.S. PATENT DOCUMENTS

| | | | |
|---|---|---|---|
| 2009/0279703 A1 | 11/2009 | McLane et al. | |
| 2010/0023782 A1 | 1/2010 | Prakash et al. | |
| 2010/0125855 A1 | 5/2010 | Ferwerda et al. | |
| 2011/0047387 A1 | 2/2011 | Gover | |
| 2011/0258438 A1 | 10/2011 | Hildebrand | |
| 2012/0016856 A1* | 1/2012 | Gandhi et al. | 707/705 |
| 2012/0265875 A1* | 10/2012 | Moran et al. | 709/224 |

FOREIGN PATENT DOCUMENTS

| | | |
|---|---|---|
| EP | 1463322 A2 | 9/2004 |
| GB | 2471282 A | 12/2010 |
| WO | 2011150450 A1 | 12/2011 |

OTHER PUBLICATIONS

Amit Agarwal et al., U.S. Appl. No. 13/664,517, filed Oct. 31, 2012.

Adobe AIR ADT code signing options, http://help.adobe.com/en_US/air/build/WS5b3ccc516d4fbf351e63e3d118666ade46-7f72.html, last downloaded Oct. 12, 2012.

Implementing your own keyStore, http://www.blackberry.com/developers/docs/7.1.0api/net/rim/device/api/crypto/doc-files/implementing_keystore.html, last downloaded Oct. 12, 2012.

What is the BlackBerry KeyStore, http://btsc.webapps.blackberry.com/btsc/viewdocument.do;jsessionid=3573BB4FD3E3FCF127551937EC7F4A0B?externalId=KB25622&sliceId=1&cmd=displayKC&docType=kc&noCount=true&ViewedDocsListHelper=com.kanisa.apps.common.BaseViewedDocsListHelperImpl, last downloaded Oct. 12, 2012.

* cited by examiner

| Application Stripe Name | KeyStore Name | Repository Type | Repository Connection |
| --- | --- | --- | --- |
| Application1 | Identity Keystore | File | File System: System1<br>File Path: system1\application1\identity_keystore.ks |
| Application1 | Trust Keystore | File | File System: System1<br>File Path: system1\application1\trust_keystore.ks |
| Application2 | Identity Keystore | File | File System: System2<br>File Path: system2\application2\identity_keystore.ks |
| Application3 | Identity Keystore | LDAP Server | Host Name: System3<br>Port: 10<br>User Name: LDAP1<br>Password: keystore |
| Application4 | Identity Keystore | Database | Host Name: System4<br>Port: 10<br>User Name: Database1<br>Password: keystore |

Fig. 3

KEYSTORE MANAGEMENT SYSTEM

FIELD

One embodiment is directed to a computer system, and more particularly, to a computer system that manages one or more keystores.

BACKGROUND

Complex software systems that include multiple software application components (such as Java® 2 Enterprise Edition ("J2EE") systems) generally require that each software application component be able to establish secure communications with each other, such as secure sockets layer ("SSL") communication, encryption, or message protection. In the context of secure communication, software systems generally rely on public key infrastructure ("PKI")-based communications, which generally require the presentation of a cryptographic key or certificate, authorization of the key or certificate, and a secure exchange of information between the two or more software application components.

"Keystores" can be used to store cryptographic keys and certificates for such secure communications, where a "keystore" is defined as a storage entity that is configured to store cryptographic keys and certificates, where the storage entity is stored within a repository. A common repository example for a keystore is a physical computer file (also identified as a file) on a file system. Other repository examples for a keystore are a lightweight directory access protocol ("LDAP") server, a database, or a hardware device (e.g., a hardware storage module).

However, even though a PKI infrastructure allows for generation of a key or certificate, the PKI infrastructure does not address how to manage the storage of the key or certificate (i.e., how to manage the keystore). Management of such a keystore, especially a keystore that is stored in a file, in the past, has generally been accomplished by using a command line tool (e.g., a "Java Development Kit ("JDK") keytool"), which is executed on a physical machine or device where the keystore is present. Such an execution generally requires physical access to the machine or device. Thus, in general, managing the keystore has previously required access to the machine or device where the keystore is present.

SUMMARY

One embodiment is directed to a keystore management system that manages a keystore. The keystore management system creates a mapping of a plurality of keystore identity parameters to a plurality of keystore repository parameters. The keystore identity parameters identify the keystore. The keystore repository parameters identify a repository that stores the keystore. The keystore is a storage entity stored on the repository. The keystore management system further stores the mapping within a configuration file. The keystore management system further receives a request to access content of the keystore from a software application. The request includes the keystore identity parameters. The keystore management system further translates the keystore identity parameters into the keystore repository parameters based on the mapping stored within the configuration file. The keystore management system further retrieves the content of the keystore from the keystore using the keystore repository parameters. The keystore management system further sends the content of the keystore to the software application.

BRIEF DESCRIPTION OF THE DRAWINGS

Further embodiments, details, advantages, and modifications will become apparent from the following detailed description of the preferred embodiments, which is to be taken in conjunction with the accompanying drawings.

FIG. 3 illustrates an example diagram of a mapping of a configuration file that maps a plurality of keystore identity parameters to a plurality of keystore repository parameters, according to an embodiment of the invention.

DETAILED DESCRIPTION

Figure 1:
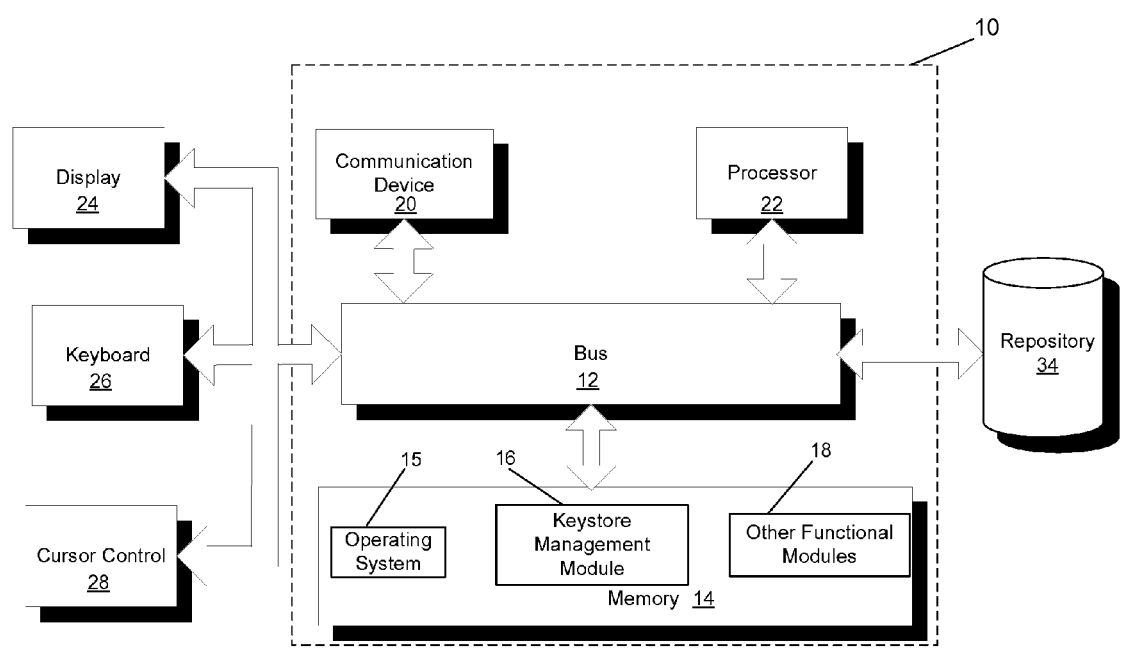
FIG. 1 illustrates a block diagram of a keystore management system that can implement an embodiment of the invention.

In one embodiment, a keystore management system is provided that can facilitate a uniform representation of a keystore using keystore identity parameters, regardless of what type of repository the keystore is physically persisted in, such as, for example, in a file, in an LDAP server, in a database, or in a hardware device (such as a hardware storage module). The keystore management system can receive keystore requests from software application components that include these keystore identity parameters, rather than any information relating to repositories that store the keystores. This can eliminate a need for a software application component to remember keystore repository parameters, such as a physical location of the keystore or a connection parameter (for example, a host, a port, a connection credential, etc.), as a software application component is not required to provide any keystore repository parameters in order to access one or more keystores. Thus, access to the keystore can be virtualized through keystore identity parameters, such as an application stripe name parameter (which can represent a software application component that the keystore is associated with), and a keystore name parameter (which can represent a unique name of the keystore). Through the use of the keystore identity parameters, the keystore management system can provide a unique identification for each keystore of an enterprise software application environment, and can also separate the representation of the keystore from the repository information of the keystore, so that the requesting software application component is not required to know the repository information of the keystore.

As previously described, management of a keystore, in the past, has generally been accomplished by physically accessing a machine or device where the keystore is stored, and thus, has previously required access to the machine or device. In a large scale deployment with n servers and m keystores, this can require having to login to n servers and accessing m keystore paths. Further, if each keystore of the m keystores requires a unique password to access the keystore itself, this requires the management of m keystore passwords. Further, in a large scale deployment that includes a large number of software application components, this may require sharing m keystores with multiple software application components. If one or more of the m keystores are moved, this requires a significant overhead to manage the m keystores to ensure that the multiple software application components can access the m keystores. Moreover, if one or more keys or certificates of the m keystores expire, an administrator may have to go to each host that includes the keystore for the specific application component and renew the individual keys or certificates. Thus, a significant amount of managerial overhead can be created by previous keystore management techniques. According to certain embodiments of the invention, a keystore management system can, at least in part, manage one or more keystores while avoiding the managerial overhead previously described, as will be described below in greater detail.

FIG. 1 illustrates a block diagram of a keystore management system 10 that can implement one embodiment of the invention. Keystore management system 10 includes a bus 12 or other communications mechanism for communicating information between components of keystore management system 10. Keystore management system 10 also includes a processor 22, operatively coupled to bus 12, for processing information and executing instructions or operations. Processor 22 may be any type of general or specific purpose processor. Keystore management system 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. Keystore management system 10 further includes a communication device 20, such as a network interface card or other communications interface, to provide access to a network. As a result, a user may interface with keystore management system 10 directly, or remotely through a network or any other method.

A computer-readable medium may be any available medium that can be accessed by processor 22. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard 26 and a cursor control device 28, such as a computer mouse, can also be operatively coupled to bus 12 to enable the user to interface with keystore management system 10.

According to one embodiment, memory 14 can store software modules that may provide functionality when executed by processor 22. The modules can include an operating system 15, a keystore management module 16, as well as other functional modules 18. Operating system 15 can provide an operating system functionality for keystore management system 10. Keystore management module 16 can provide functionality for managing a keystore, as will be described in more detail below. In certain embodiments, keystore management module 16 can comprise a plurality of modules, where each module provides specific individual functionality for managing a keystore. Keystore management system 10 can also be part of a larger system. Thus, keystore management system 10 can include one or more additional functional modules 18 to include the additional functionality. For example, functional modules 18 may include modules that provide additional functionality, such as a module of the "Oracle Fusion Middleware" product from Oracle Corporation.

Processor 22 can also be operatively coupled via bus 12 to a repository 34. Repository 34 can store data, such as one or more keystores. In one embodiment, repository 34 is a database. In this embodiment, repository 34 can store data in an integrated collection of logically-related records or files. Further, in this embodiment, repository 34 can be an operational database, an analytical database, a data warehouse, a distributed database, an end-user database, an external database, a navigational database, an in-memory database, a document-oriented database, a real-time database, a relational database, an object-oriented database, or any other database known in the art. In an alternate embodiment, repository 34 can be a file of a file system. In another alternate embodiment, repository 34 can be an LDAP server. In yet another alternate embodiment, repository 34 can be a hardware device (such as a hardware storage module).

Figure 2:
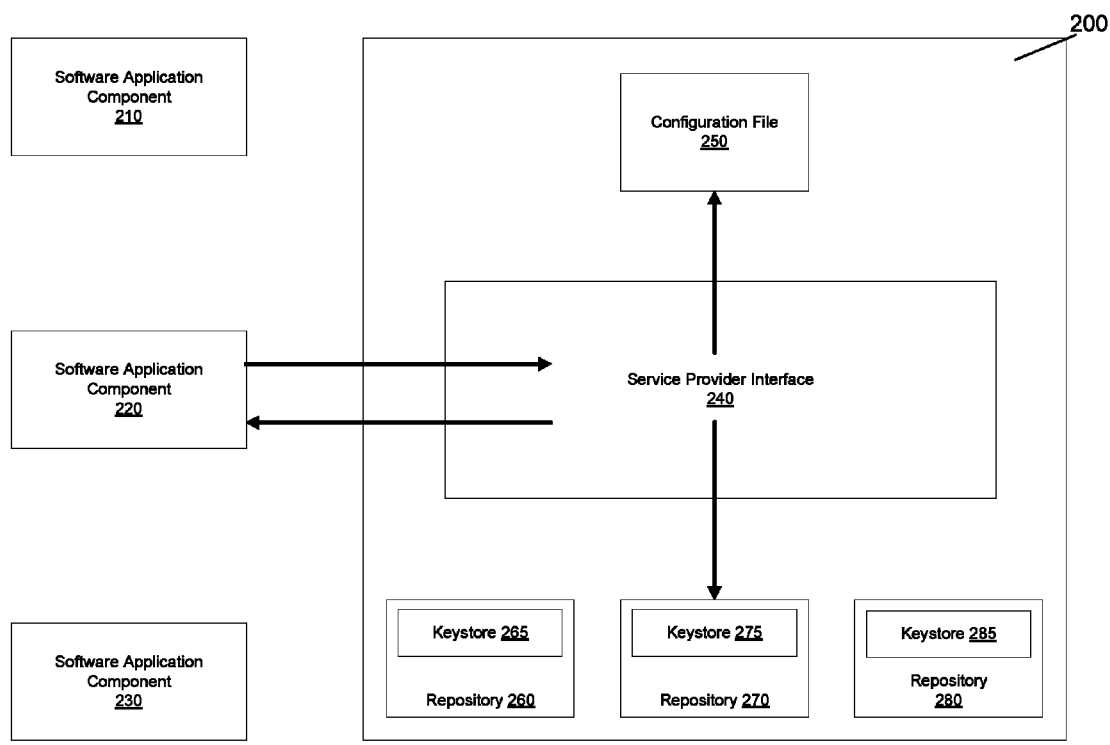
FIG. 2 illustrates a block diagram of an enterprise software application environment that includes a keystore management system, according to an embodiment of the invention.

FIG. 2 illustrates a block diagram of an enterprise software application environment that includes a keystore management system 200, according to an embodiment of the invention. In one embodiment, keystore management system 200 is identical to keystore management system 10 of FIG. 1. An enterprise software application environment is an environment of an enterprise software application, where an enterprise software application can include a collection of software application components configured to provide business functionality, such as order processing, procurement, production scheduling, customer information management, energy management, or accounting. An enterprise software application can be hosted on the enterprise software application environment, where the enterprise software application environment can include any number of servers, and can provide simultaneous services to a large number of users, typically over a computer network. In the illustrated embodiment, the enterprise software application environment includes keystore management system 200 which provides functionality for managing one or more keystores, as is described below in greater detail. Also, in the illustrated embodiment, the enterprise software application environment also includes software application components 210, 220, and 230. Software application components 210, 220, and 230 are each a component of a software application, where a software application is any collection of computer programs and/or modules configured to perform specified functionality. An example of a software application is the product "Oracle WebLogic Server" by Oracle Corporation. Another example of a software application is the product "Oracle WebCenter" by Oracle Corporation. However, the illustrated embodiment is merely an example embodiment, and in alternate embodiments, an enterprise software application environment can include any number of software application components.

As previously described, software application components 210, 220, and 230 can establish secure communications with each other in order to send and receive information, while reducing the risk that the communications with be intercepted by a third party. Such secure communications can be based on PKI-based communications, which can require a presentation of a cryptographic key or certificate, authorization of the key or certificate, and a secure exchange of information between the two or more software application components. Thus, application components 210, 220, and 230 can require access to one or more keys or certificates, in order to securely communicate with each other or external entities in other systems. As is described below in greater detail, these keys and certificates can be stored within one or more keystores, and keystore management system 200 can, at least in part, manage access to the one or more keystores by providing a uniform representation of the one or more keystores that is not dependent on how the one or more keystores are physically stored.

According to an embodiment, keystore management system 200 can virtualize access to the one or more keystores through a set of keystore identity parameters, where the keystore identity parameters identify a keystore. Within the enterprise software application environment, each software application component (such as software application components 210, 220, and 230) can have its own namespace (identified as an "application stripe") and each software application component can have one or more keystores stored within the software application component's application stripe. Thus, keystore management system 200 can represent each keystore using a set of keystore identity parameters. In one embodiment, each set of keystore identity parameters for a keystore can include two parameters: an application stripe name parameter that uniquely identifies a software application component that the keystore is associated with; and a keystore name parameter that uniquely identifies the keystore. Because a software application component can have a plurality of keystores stored within the software application component's application stripe, the keystore name parameter can be used to distinguish between the keystores stored within the software application component's application stripe. According to the embodiment, the keystore identity parameters do not require any information regarding where the keystore is physically stored or persisted. As is described below in greater detail, keystore management system 200 can determine this information based on the set of keystore identity parameters provided by an software application component (such as software application components 210, 220, and 230). Thus, a software application component is not required to know any information regarding where the keystore is physically stored or persisted in order to request access to keystore. Instead, the software application component can provide keystore management system 200 with the set of keystore identity parameters, and keystore management system 200 can locate the keystore using the set of keystore identity parameters.

According to the illustrated embodiment, keystore management system 200 includes service provider interface ("SPI") 240 which is configured to retrieve, store, or edit a keystore based on a set of keystore identity parameters. In one embodiment, SPI 240 can be configured to retrieve, store, or edit a keystore based on an application stripe name parameter and a key store name parameter. SPI 240 can provide a collection of methods, where the methods can facilitate retrieving a keystore from a repository, retrieving one or more keys or certificates from the keystore, creating a keystore, creating one or more keys or certificates within the keystore, updating one or more keys or certificates within the keystore, deleting a keystore, or deleting one or more keys or certificates from the keystore.

As is described below in greater detail, one or more keystores can be stored in one or more types of repositories. Examples of such repository types include a file of a file system, an LDAP server, a database, or a hardware device (such as a hardware storage module). According to the embodiment, as is also described below in greater detail, the methods of SPI 240 can receive the set of keystore identity parameters (such as an application stripe name parameter and a keystore name parameter), and can translate the set of keystore identity parameters into a set of keystore repository parameters, where the keystore repository parameters identify a repository that stores the keystore. The methods of SPI 240 can then use the set of keystore repository parameters to access and retrieve content of the keystore. According to an embodiment, a class for each repository type (not illustrated in FIG. 2) can implement the methods of SPI 240, and thus, can facilitate retrieving a keystore from a repository, retrieving one or more keys or certificates from the keystore, creating a keystore, creating one or more keys or certificates within the keystore, updating one or more keys or certificates within the keystore, deleting a keystore, or deleting one or more keys or certificates from the keystore.

According to the illustrated embodiment, keystore management system 200 further includes configuration file 250. Configuration file 250 can store information regarding one or more repositories, where each repository can store one or more keystores. In one embodiment, configuration file 250 can store this information in the format of one or more keystore repository parameters. Thus, configuration file 250 can store one or more keystore repository parameters, where the one or more keystore repository parameters can be used by one or more keystores. In one embodiment, the one or more keystore repository parameters can include a repository type parameter that identifies a type of repository, and one or more repository connection parameters that identify information used to connect to the repository. Example types of repositories include a file, an LDAP server, a database, or a hardware device (such as a hardware storage module). The repository connection parameters can depend on the type of the repository. For example, in one embodiment, if the type of repository is a file, the repository connection parameters can include a file system parameter that identifies a location of a file that stores a keystore, and a file path parameter that identifies a path of a file that stores the keystore. According to the embodiment, if the type of repository is an LDAP server, the repository connection parameters can include a host name parameter that identifies a location of the LDAP server, a port parameter that identifies a port of the LDAP server, a user name parameter that identifies a user name that is used to connect to the LDAP server, and a password parameter that identifies a password that is used to connect to the LDAP server. Further, according to the embodiment, if the type of repository is a database, the repository connection parameters can include a host name parameter that identifies a location of the database, a port parameter that identifies a port of the database, a user name parameter that identifies a user name that is used to connect to the database, and a password parameter that identifies a password that is used to connect to the database. In one embodiment, a loading process can be executed to load the information regarding one or more repositories into configuration file 250. Further, in this embodiment, when a new repository is created, the information regarding the repository can be loaded into configuration file 250 through a supplemental loading process.

Further, according to the illustrated embodiment, configuration file 250 can map a set of keystore identity parameters to a set of keystore repository parameters. In other words, configuration file 250 can associate a set of keystore identity parameters that identify the keystore with a set of keystore repository parameters that identify a repository that stores the keystore. These one or more associations can be further stored within configuration file 250 as a mapping. Such a mapping of configuration file 250 is further described below in relation to FIG. 3. In one embodiment, where a new keystore is created within a repository, a set of keystore identity parameters that correspond to the new keystore can be mapped to a set of keystore identity parameters that identity a repository that stores the new keystore. In this embodiment, the new mapping can be used by SPI 240 to access the repository and create the new keystore within the repository.

Thus, SPI 240, when provided a set of keystore identity parameters, can search the mapping of configuration file 250 and locate a corresponding set of keystore repository parameters. Based on the mapping of configuration file 250, SPI 240 can translate a set of keystore identity parameters into a set of keystore repository parameters. Thus, according to the embodiment, SPI 240 can identify and locate a keystore associated with the set of keystore identity parameters, no matter where the keystore is persisted. Furthermore, a software application component that requests access to a keystore does not need to know information regarding a repository where the keystore is persisted. Instead, the software application component only is required to provide the set of keystore identity parameters. SPI 240 is an example SPI that can be provided within keystore management system 200, according to an example embodiment. In other embodiments, another SPI can be provided within keystore management system 200 that performs the aforementioned functionality of SPI 240.

According to the illustrated embodiment, keystore management system 200 further includes repositories 260, 270, and 280, where repository 260 includes keystore 265, repository 270 includes keystore 275, and repository 280 includes keystore 285. However, this is merely an example embodiment, and in alternate embodiments, keystore management system 200 can include any number of repositories, where each repository can include any number of keystores. As previously described, a repository is a storage entity configured to store one or more keystores, and a keystore is a storage entity configured to store one or more cryptographic keys or certificates. As also previously described, application components 210, 220, and 230 can require access to one or more keys or certificates, in order to securely communicate with each other or with an external entity. In addition, as also previously described, these keys and certificates can be stored within one or more keystores, where one or more keystores can be stored within one or more repositories. Further, repositories 260, 270, and 280, can be repositories of any type. Example types of repositories include a file, an LDAP server, a database, and a hardware device (such as a hardware storage module).

After SPI 240 has translated a set of keystore identity parameters into a set of keystore repository parameters, SPI 240 can use the keystore repository parameters to access one or more keystores (such as keystores 265, 275, and 285) that are stored within one or more repositories (such as repositories 265, 275, and 285). The accessing the one or more keystores can include retrieving the one or more keystores from the one or more repositories and storing the one or more keystores within a memory of keystore management system 200 (not illustrated in FIG. 2). For example, in one embodiment, if the type of repository is a file, SPI 240 can access the file using the file system parameter and the file path parameter, and access one or more keystores stored within the file. In another embodiment, if the type of repository is an LDAP server, SPI 240 can connect to the LDAP server using the host name parameter, the port parameter, the user name parameter, and the password parameter, and access one or more keystores stored within the LDAP server. Further, in another embodiment, if the type of repository is a database, SPI 240 can connect to the database using the host name parameter, the port parameter, the user name parameter, and the password parameter, and access one or more keystores stored within the database. In certain embodiments, accessing a key store can include retrieving the keystore from the repository, retrieving one or more keys or certificates from the keystore, creating one or more keys or certificates within the keystore, updating one or more keys or certificates within the keystore, deleting the keystore, or deleting one or more keys or certificates from the keystores. In other embodiments, SPI 240 can use the keystore repository parameters to create one or more keystores. According to one embodiment, a class for each repository type (not illustrated in FIG. 2) can use the keystore repository parameters to access one or more keystores (such as keystores 265, 275, and 285) that are stored within one or more repositories (such as repositories 260, 270, and 280). Thus, according to the embodiment, SPI 240 can interact with repositories of any repository type, and can be implemented in any enterprise software application environment.

An example embodiment is now described. In the example embodiment, software application component 220 sends a request to access one or more keys or certificates of keystore 275, which is stored within repository 270. Of course, this is only an example embodiment, and in alternate embodiments, any software application component can send a request to access any keys or certificates of any keystore, which can be stored within any repository. In one embodiment, the request can be a request to retrieve one or more keys or certificates of keystore 275. In an alternate embodiment, the request can be a request to create one or more keys or certificates of keystore 275. In another alternate embodiment, the request can be a request to update one or more keys or certificates of keystore 275. In yet another alternate embodiment, the request can be a request to delete keystore 275. In yet another alternate embodiment, the request can be a request to delete one or more keys or certificates of keystore 275. In addition, in an alternate embodiment, rather than a request to access one or more keys or certificates of keystore 275, software application component 220 can send a request to create a new keystore within repository 270.

According to the example embodiment, software application component 220 sends the request to SPI 240, where the request includes a set of keystore identity parameters that correspond to keystore 275. In one embodiment, the set of keystore identity parameters can include an application stripe name parameter and a keystore name parameter that collectively correspond to keystore 275. SPI 240 subsequently accesses a mapping stored within configuration file 250 and retrieves a set of keystore repository parameters that are mapped to the set of keystore identity parameters. In one embodiment, the set of keystore repository parameters can include a repository type parameter that identifies a type of repository for repository 270, and one or more repository connection parameters that identify information used to connect to repository 270. By retrieving the set of keystore repository parameters that are mapped to the set of keystore identity parameters, SPI 240 effectively translates the set of keystore identity parameters into the set of keystore repository parameters. SPI 240 (or a class implementing a method of SPI 240) uses the set of keystore repository parameters to access one or more keys or certificates of keystore 275 that is stored within repository 270. If the request to access one or more keys or certificates of keystore 275 sent by software application component 220 requires keystore management system 200 to return the one or more keys or certificates of keystore 275 (or possibly keystore 275 itself), SPI 240 can send the one or more keys or certificates of keystore 275 (or keystore 275 itself) to software application component 220.

In one embodiment, a keystore (such as keystore 265) can be moved from a first repository (such as repository 260) to a second repository (such as repository 270 or repository 280). In this embodiment, the mapping in configuration file 250 is updated, where the set of keystore identity parameters that correspond to the keystore are associated with a set of keystore repository parameters that correspond to the second repository, rather than the first repository. Thus, a software application component (such as software application components 210, 220, and 230) can continue to refer to the keystore by the same set of keystore identity parameters, and SPI 240 can use the updated mapping in configuration file 250 to provide access to the correct keystore.

According to one embodiment, SPI 240 can provide a custom runtime keystore provider interface for accessing a keystore at runtime. For example, this method can be a LoadStoreParameter( ) interface. SPI 240 can provide a LoadStoreParameter( ) interface that can be implemented by a repository type class (not illustrated in FIG. 2), where the LoadStoreParameter( ) interface specifies a set of keystore identity parameters that identify a keystore. In one embodiment, the set of keystore identity parameters for the LoadStoreParameter( ) interface can include an application stripe name parameter that uniquely identifies a software application component that the keystore is associated with, and a keystore name parameter that uniquely identifies the keystore. In an alternate embodiment, the set of keystore identity parameters can also include a password parameter that identifies a password used to access the keystore.

Below is an example of psuedocode for a requesting software application component (such as software application components 210, 220, and 230) that can send a request to SPI 240 to access a keystore using the LoadStoreParameter( ) interface:

```
KeyStore ks = KeyStore.getInstance("FKS", "FarmKeyStoreProvider");
FarmKeyStoreLoadStoreParameters param = new FarmKeyStoreLoadStoreParameters( );
char[ ] ksPwd = ...; // get key store password
param.setStripeName("app1")
param.setKeystoreName("keystore");
param.setPassword(ksPwd);
ks.load(param);
KeyStore ts = KeyStore.getInstance("FKS", "FarmKeyStoreProvider");
param = new FarmKeyStoreLoadStoreParameters( );
char[ ] tsPwd = ...; // get trust store password
param.setStripeName("app1");
param.setKeystoreName("truststore");
param.setPassword(tsPwd);
ts.load(param);
        KeyManagerFactory kmf =
        KeyManagerFactory.getInstance("SunX509");
        kmf.init(ks, ksPwd);
        TrustManagerFactory tmf =
        TrustManagerFactory.getInstance("SunX509");
        tmf.init(ts);
        SSLContext ctx = SSLContext.getInstance("TLS");
        ctx.init(kmf.getKeyManagers( ), tmf.getTrustManagers( ), null);
```

Below is another example of psuedocode for a requesting software application component (such as software application components 210, 220, and 230) that can send a request to SPI 240 to access a keystore using the LoadStoreParameter( ) interface:

```
KeyStore ks = KeyStore.getInstance("FKS", "FarmkeyStoreProvider");
FarmKeyStoreLoadStoreParameters param = new FarmKeyStoreLoadStoreParameters( );
char[ ] ksPwd = ...;
param.setStripename("system")
param.setKeystoreName("wlssslidentity");
param.setPassword(ksPwd);
ks.load(param);
KeyStore ts = KeyStore.getInstance("FKS", "FarmKeyStoreProvider");
param = new FarmKeyStoreLoadStoreParameters( );
char[ ] tsPwd = ...;
param.setStripeName("system)
param.setKeystoreName("wlsssltrust");
// if the domain level trust store needs to be used, use the name
// system/trust. There is no password for this trust store, so
// pass null in the setPassword method.
param.setPassword(tsPwd);
ts.load(param);
        KeyManagerFactory kmf =
        KeyManagerFactory.getInstance("SunX509");
        kmf.init(ks, ksPwd);
        TrustManagerFactory tmf =
        TrustManagerFactory.getInstance("SunX509"); tmf.init(ts);
        SSLContext ctx = SSLContext.getInstance("TLS");
        ctx.init(kmf.getKeyManagers( ), tmf.getTrustManagers( ), null);
```

According to an alternate embodiment, SPI 240 can introduce additional application programming interfaces ("APIs") that can return a keystore. The following APIs can be introduced within SPI 240: (a) public KeyStore get FarmTrustStore( ) (which can return a common domain level trust store and does not require a password); (b) public KeyStore getKeyStore (String stripeName, String keystoreName, char[ ] password); (which can return a specified keystore from an application strip protected by the given password; and (c) public KeyStore getDefaultApplicationKeyStore (char[ ] password); (which can return a default application key store).

Below is an example of psuedocode for a requesting software application component (such as software application components 210, 220, and 230) that can send a request to SPI 240 to access a keystore using the getKeyStore( ) API:

```
KeyStoreService kService = ... ;// get service handle
char[ ] ksPwd =... ;// get key store password
char[ ] tsPwd = ... ;// get trust store password
KeyStore ks = kService.getKeyStore("app1", "keystore1", ksPwd);
KeyStore ts = kService.getKeyStore("app1", "keystore2", tsPwd);
// To use domain trust store, replace keystore name with
// "system/trust" and password with null
        KeyManagerFactory kmf =
    KeyManagerFactory.getInstance("SunX509"); kmf.init(ks, ksPwd);
        TrustManagerFactory tmf =
        TrustManagerFactory.getInstance("SunX509");
        tmf.init(ts);
        SSLContext ctx = SSLContext.getInstance("TLS");
        ctx.init(kmf.getKeyManagers( ), tmf.getTrustManagers( ), null);
```

Below is another example of psuedocode for a requesting software application component (such as software application components 210, 220, and 230) that can send a request to SPI 240 to access a keystore using the getKeyStore( ) API:

```
KeyStoreService kService = ... ;// get service handle
char[ ] ksPwd = ...;
char[ ] tsPwd = ...;
KeyStore ks = kService.getKeyStore("system", "wlssslidentity", ksPwd);
KeyStore ts = kService.getKeyStore("system", "wlsssltrust", tsPwd);
// To use domain trust store, replace keystore name with
// "system/trust" and password with null
        KeyManagerFactory kmf =
    KeyManagerFactory.getInstance("SunX509"); kmf.init(ks, ksPwd);
        TrustManagerFactory tmf =
        TrustManagerFactory.getInstance("SunX509");
```

```
tmf.init(ts);
SSLContext ctx = SSLContext.getInstance("TLS");
ctx.init(kmf.getKeyManagers( ), tmf.getTrustManagers( ),
    null);
```

FIG. 3 illustrates an example diagram of a mapping 300 of a configuration file that maps a plurality of keystore identity parameters 310 to a plurality of keystore repository parameters 320, according to an embodiment of the invention. As previously described, mapping 300 can include, for each keystore, an association between keystore identity parameters 310 and keystore repository parameters 320.

In the illustrated embodiment, each row of the rows within mapping 300 (i.e., rows 330, 340, 350, 360, and 370) represents a keystore. One of ordinary skill in the art would readily appreciate that the illustrated embodiment is an example embodiment, and that, in alternate embodiments, mapping 300 can include any number of rows, where the number of rows corresponds to a number of keystores.

Further, according to the embodiment, each row includes a set of keystore identity parameters 310, where each set of keystore identity parameters 310 includes an application stripe name parameter and a keystore name parameter. The application stripe name parameter uniquely identifies a software application that the keystore corresponds to. The keystore name parameter uniquely identifies the keystore. In addition, according to the embodiment, each row also includes a set of keystore repository parameters 320, where each set of keystore repository parameters includes a repository type parameter and one or more repository connection parameters. The repository type parameter identifies a type of the repository, and the one or more repository connection parameters identify information used to connect to the repository.

According to the embodiment, the repository connection parameters can depend on the type of the repository. For example, if the type of repository is a file, the repository connection parameters can include a file system parameter that identifies a location of a file that stores a keystore and a file path parameter that identifies a path of a file that stores the keystore. If the type of repository is an LDAP server, the repository connection parameters can include a host name parameter that identifies a location of the LDAP server, a port parameter that identifies a port of the LDAP server, a user name parameter that identifies a user name that is used to connect to the LDAP server, and a password parameter that identifies a password that is used to connect to the LDAP server. Further, if the type of repository is a database, the repository connection parameters can include a host name parameter that identifies a location of the database, a port parameter that identifies a port of the database, a user name parameter that identifies a user name that is used to connect to the database, and a password parameter that identifies a password that is used to connect to the database.

Thus, in the illustrated embodiment, row 330 includes an application stripe name parameter with the value "Application1," a keystore name parameter with the value "Identity Keystore," a repository type parameter with the value "File," a file system parameter with the value "System1," and a file path parameter with the value "system1\application1\identity_keystore.ks." Row 340 includes an application stripe name parameter with the value "Application1," a keystore name parameter with the value "Trust Keystore," a repository type parameter with the value "File," a file system parameter with the value "System1," and a file path parameter with the value "system1\application1\trust_keystore.ks." Row 350 includes an application stripe name parameter with the value "Application2," a keystore name parameter with the value "Identity Keystore," a repository type parameter with the value "File," a file system parameter with the value "System2," and a file path parameter with the value "system2\application2\identity_keystore.ks." Row 360 includes an application stripe name parameter with the value "Application3," a keystore name parameter with the value "Identity Keystore," a repository type parameter with the value "LDAP server," a host name parameter with the value "System3," a port parameter with a value "10," a user name parameter with the value "LDAP1," and a password parameter with the value "keystore." Row 370 includes an application stripe name parameter with the value "Application4," a keystore name parameter with the value "Identity Keystore," a repository type parameter with the value "Database," a host name parameter with the value "System4," a port parameter with a value "10," a user name parameter with the value "Database1," and a password parameter with the value "keystore."

As one of ordinary skill in the art would appreciate, FIG. 3 illustrates an example diagram of mapping 300 according to one embodiment. However, in alternate embodiments, mapping 300 could be of a different format, and still be within a scope of the invention.

Figure 4:
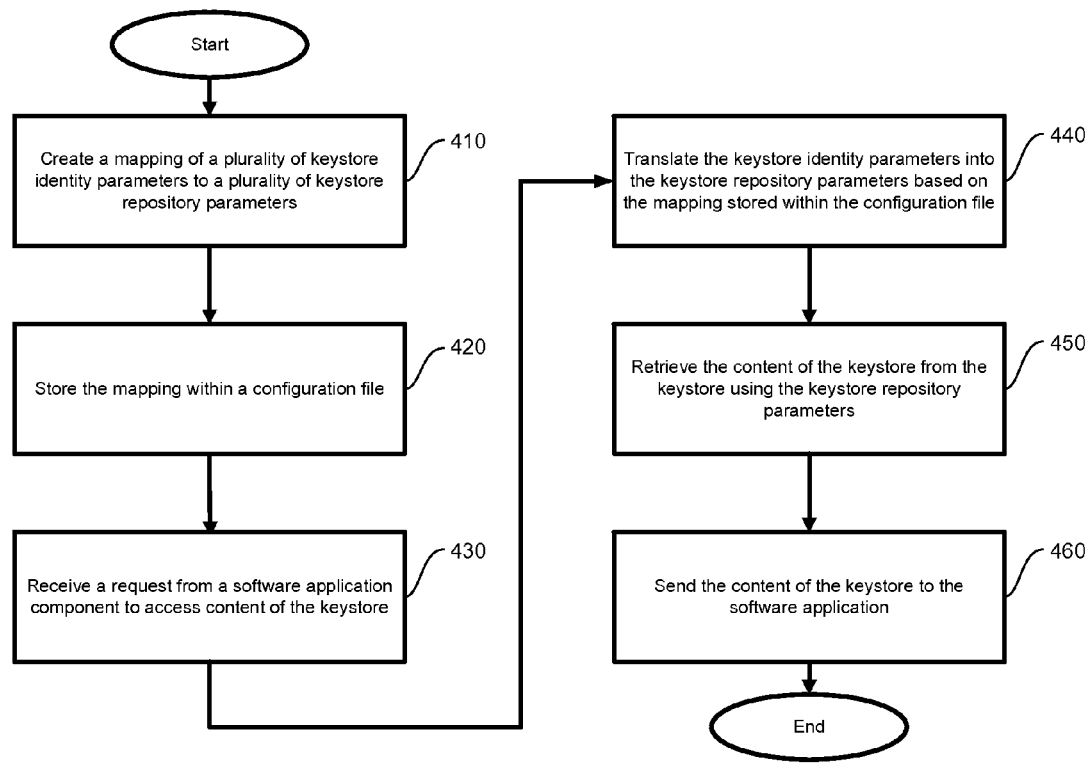
FIG. 4 illustrates a flow diagram of the functionality of a keystore management module, according to an embodiment of the invention.

FIG. 4 illustrates a flow diagram of the functionality of a keystore management module (such as keystore management module 16 of FIG. 1), according to an embodiment of the invention. In one embodiment, the functionality of the flow diagram of FIG. 4, as well as the functionalities of the flow diagrams of FIGS. 5 and 6, which are described below, are implemented by software stored in a memory or some other computer-readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

The flow begins and proceeds to 410. At 410, a mapping of a plurality of keystore identity parameters to a plurality of keystore repository parameters is created. The keystore identity parameters of the plurality of keystore identity parameters identify the keystore. The keystore repository parameters of the plurality of keystore repository parameters identify a repository that stores the keystore. The keystore includes a storage entity stored on the repository.

In one embodiment, the keystore identity parameters of the plurality of keystore identity parameters include an application stripe name parameter that uniquely identifies a software application component, and a keystore name parameter that uniquely identifies the keystore. Also in the embodiment, the keystore repository parameters include a repository type parameter that identifies a type of the repository, and one or more repository connection parameters that identify information used to connect to the repository. In one embodiment, the type of repository is one of a file, an LDAP server, a database, or a hardware device (such as a hardware storage module).

In one embodiment, when the type of repository is a file, the repository connection parameters include a file system parameter that identifies a location of the file that stores the keystore, and a file path parameter that identifies a path of the file that stores the keystore. In the embodiment, when the type of repository is an LDAP server, the repository connection parameters include a host name parameter that identifies a location of the LDAP server, a port parameter that identifies a port of the LDAP server, a user name parameter that identifies a user name that is used to connect to the LDAP server, and a password parameter that identifies a password that is used to connect to the LDAP server. In the embodiment, when the type of repository is a database, the repository connection parameters include a host name parameter that identifies a location of the database, a port parameter that identifies a port of the database, a user name parameter that identifies a user name that is used to connect to the database, and a password parameter that identifies a password that is used to connect to the database. The flow proceeds to 420.

At 420, the mapping is stored within a configuration file. The flow proceeds to 430. At 430, a request to access content of the keystore is received from a software application component. The request includes the keystore identity parameters of the plurality of keystore identity parameters. In one embodiment, the content of the keystore includes, at least one of, one or more cryptographic keys, or one or more cryptographic certificates. In another embodiment, the content of the keystore includes the entire keystore. The flow then proceeds to 440.

At 440, the keystore identity parameters of the plurality of the keystore identity parameters are translated into the keystore repository parameters of the plurality of keystore repository parameters based on the mapping stored within the configuration file. The flow then proceeds to 450. At 450, the content of the keystore is retrieved from the keystore using the keystore repository parameters of the plurality of keystore repository parameters. The flow then proceeds to 460. At 460, the content of the keystore is sent to the software application component. The flow then ends.

Figure 5:
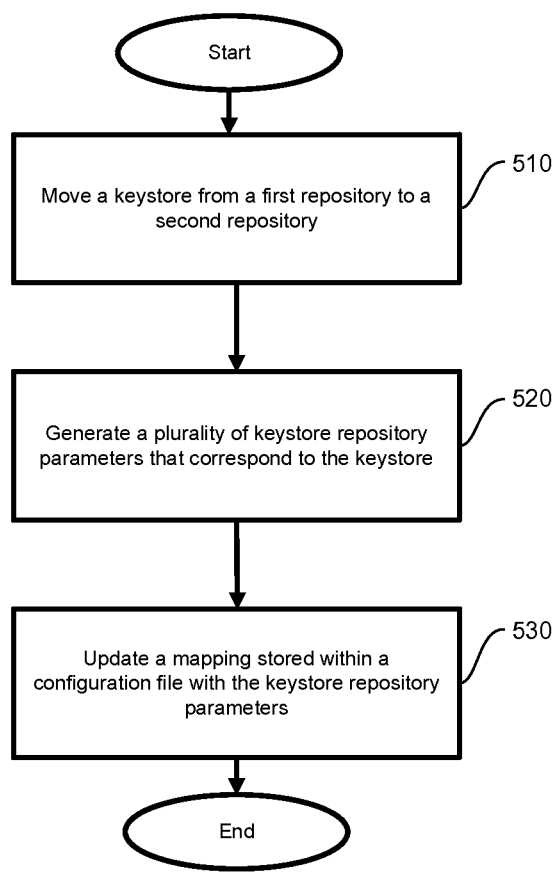
FIG. 5 illustrates another flow diagram of the functionality of a keystore management module, according to an embodiment of the invention.

FIG. 5 illustrates another flow diagram of the functionality of a keystore management module, according to an embodiment of the invention. The flow begins and proceeds to 510. At 510, a keystore is moved from a first repository to a second repository. The flow proceeds to 520. At 520, a plurality of keystore repository parameters is generated that corresponds to the keystore. The keystore repository parameters of the plurality of keystore repository parameters identify the second repository that stores the keystore. The flow proceeds to 530. At 530, a mapping stored within a configuration file is updated with the keystore repository parameters of the plurality of keystore repository parameters. In one embodiment, the mapping is updated by replacing previous keystore repository parameters stored within the mapping with the newly generated keystore repository parameters. The flow then ends. Thus, according to the embodiment, a keystore management system can move a keystore from a first repository to a second repository (for example, to increase storage efficiency, or to leverage repository properties such as scalability, better performance, backup features, and recovery features), and a software application component is not required to have any knowledge of this movement. Because the newly generated keystore repository parameters replace the previous keystore repository parameters, the newly generated keystore repository parameters are now associated with a plurality of keystore identity parameters that are also stored within the configuration file. Thus, a software application component can continue to request access to the moved keystore using the keystore identity parameters, and from the software application component's perspective, nothing has changed with respect to the moved keystore.

Figure 6:
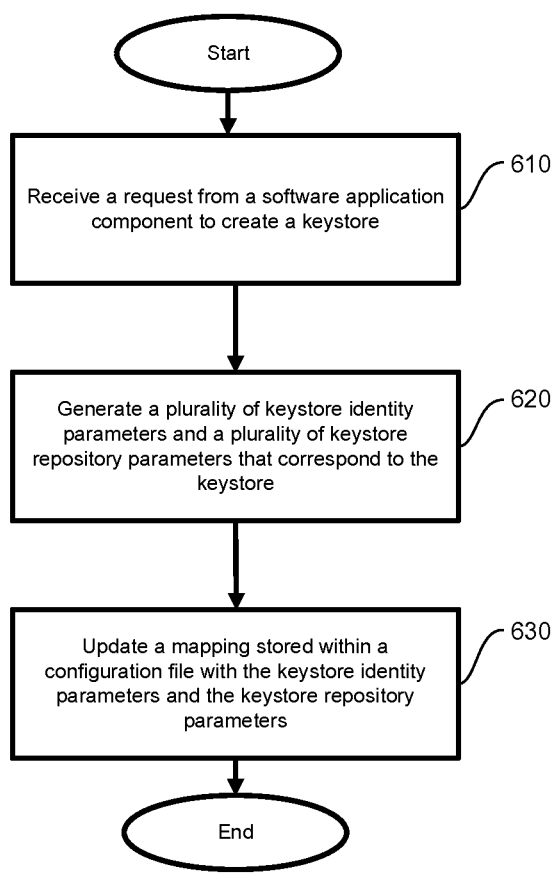
FIG. 6 illustrates another flow diagram of the functionality of a keystore management module, according to an embodiment of the invention.

FIG. 6 illustrates another flow diagram of the functionality of a keystore management module, according to an embodiment of the invention. The flow begins and proceeds to 610. At 610, a request to create a keystore is received from a software application component. The flow proceeds to 620. At 620, a plurality of keystore identity parameters and a plurality of keystore repository parameters that correspond to the keystore are generated. The keystore identity parameters of the plurality of keystore identity parameters identify the keystore. The keystore repository parameters of the plurality of keystore repository parameters identify a repository that store the keystore. The flow proceeds to 630. At 630, a mapping stored in a configuration file is updated with the keystore identity parameters of the plurality of keystore identity parameters and the keystore repository parameters of the plurality of keystore repository parameters. In one embodiment, the mapping is updated by storing the keystore identity parameters of the plurality of keystore identity parameters and the keystore repository parameters of the plurality of keystore repository parameters within the mapping. The flow then ends.

Thus, according to an embodiment, a keystore management system can, at least in part, manage one or more keystores by providing a uniform representation of the one or more keystores using keystore identity parameters, such as an application stripe name parameter and a key store name parameter. Details regarding how the keystore is physical stored can be abstracted by using keystore identity parameters. Thus, software application components do not require knowledge of the physical storage details of each keystore. This allows administrators of the software application components to focus on the use of keys and certificates provided by the keystores, rather than the storage and management of the keystores. Further, a software application component's usage of keys and certificates provided by the keystores can stay unchanged regardless of where and how the keystore is persisted and secured (for example whether the keystore is persisted within a file stored on a disk, or persisted in a database that is centrally managed).

In addition, the flexibility of using various repositories for storing one or more keystores can allow an enterprise software application to leverage the capabilities of the various repositories without having to do it from scratch for the keystore. For example, using a database or an LDAP server as a repository to store one or more keystores can provide for a centralized repository that can be accessed from multiple hosts, and can allow sharing of keystores without duplicating/copying content. Further, separating out the details regarding the persistence of the keystores can leverage abilities of the repository, which can improve scalability. For example, if a keystore needs to be accessible from a large number of software application components, storing the keystore in a central repository, such as an LDAP server or a database can allow the enterprise software application to scale. Finally, a uniform representation of the one or more keystores allows a software application component to request access to a plurality of keystores in a consistent way, rather than requesting access differently depending on how and where the keystore is stored.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to manage a keystore, the managing comprising:
   creating a mapping of a plurality of keystore identity parameters to a plurality of keystore repository parameters, wherein the keystore identity parameters identify the keystore, wherein the keystore repository parameters identify a repository that stores the keystore, and wherein the keystore comprises a storage entity stored on the repository;
   storing the mapping within a configuration file;
   receiving a request to access content of the keystore from a software application component, wherein the request comprises the keystore identity parameters;
   translating the keystore identity parameters into the keystore repository parameters based on the mapping stored within the configuration file;
   retrieving the content of the keystore from the keystore using the keystore repository parameters; and
   sending the content of the keystore to the software application component;
   wherein the keystore repository parameters comprise a repository type parameter that identifies a type of the repository, and one or more repository connection parameters that identify information used to connect to the repository;
   wherein the keystore repository parameters are different for each type of repository; and
   wherein when the type of repository comprises a server or database, the repository connection parameters comprise a host name parameter that identifies a location of the server or database, a port parameter that identifies a port of the server or database, a user name parameter that identifies a user name that is used to connect to the server or database, and a password parameter that identifies a password that is used to connect to the server or database.

2. The non-transitory computer-readable medium of claim 1, wherein the content of the keystore further comprises at least one of: one or more cryptographic keys, or one or more cryptographic certificates.

3. The non-transitory computer-readable medium of claim 1,
   wherein the keystore identity parameters comprise an application stripe name parameter that uniquely identifies the software application component, and a keystore name parameter that uniquely identifies the keystore.

4. The non-transitory computer-readable medium of claim 3,
   wherein the type of repository comprises one of a file, a lightweight directory access protocol server, or a database.

5. The non-transitory computer-readable medium of claim 4,
   wherein when the type of repository comprises a file, the repository connection parameters comprise a file system parameter that identifies a location of the file that stores the keystore, and a file path parameter that identifies a path of the file that stores the keystore;
   wherein when the type of repository comprises a lightweight directory access protocol server, the repository connection parameters comprise a host name parameter that identifies a location of the lightweight directory access protocol server, a port parameter that identifies a port of the lightweight directory access protocol server, a user name parameter that identifies a user name that is used to connect to the lightweight directory access protocol server, and a password parameter that identifies a password that is used to connect to the lightweight directory access protocol server; and
   wherein when the type of repository comprises a database, the repository connection parameters comprise a host name parameter that identifies a location of the database, a port parameter that identifies a port of the database, a user name parameter that identifies a user name that is used to connect to the database, and a password parameter that identifies a password that is used to connect to the database.

6. The non-transitory computer-readable medium of claim 1, the managing further comprising:
   moving the keystore from the repository to another repository;
   generating an additional plurality of keystore repository parameters that corresponds to the keystore, wherein the additional keystore repository parameters identify the other repository that stores the keystore; and
   updating the mapping stored within the configuration file with the additional keystore repository parameters.

7. The non-transitory computer-readable medium of claim 6, wherein the updating the mapping further comprises replacing the keystore repository parameters stored within the mapping with the additional keystore repository parameters.

8. The non-transitory computer-readable medium of claim 1, the managing further comprising:
   receiving a request from the software application component to create another keystore;
   generating an additional plurality of keystore identity parameters and an additional plurality of keystore repository parameters that correspond to the other keystore, wherein the additional keystore identity parameters identify the other keystore, and wherein the additional keystore repository parameters identify a repository that stores the other keystore; and
   updating the mapping stored within the configuration file with the additional keystore identity parameters and the additional keystore repository parameters.

9. The non-transitory computer-readable medium of claim 8, wherein the updating the mapping further comprises storing the additional keystore identity parameters and the additional keystore repository parameters within the mapping.

10. The non-transitory computer-readable medium of claim 1, wherein the content of the keystore further comprises the entire keystore.

11. A computer-implemented method for managing a keystore, the computer-implemented method comprising:

creating a mapping of a plurality of keystore identity parameters to a plurality of keystore repository parameters, wherein the keystore identity parameters identify the keystore, wherein the keystore repository parameters identify a repository that stores the keystore, and wherein the keystore comprises a storage entity stored on the repository;

storing the mapping within a configuration file;

receiving a request to access content of the keystore from a software application component, wherein the request comprises the keystore identity parameters;

translating the keystore identity parameters into the keystore repository parameters based on the mapping stored within the configuration file;

retrieving the content of the keystore from the keystore using the keystore repository parameters; and sending the content of the keystore to the software application component;

wherein the keystore repository parameters comprise a repository type parameter that identifies a type of the repository, and one or more repository connection parameters that identify information used to connect to the repository;

wherein the keystore repository parameters are different for each type of repository; and wherein when the type of repository comprises a server or database, the repository connection parameters comprise a host name parameter that identifies a location of the server or database, a port parameter that identifies a port of the server or database, a user name parameter that identifies a user name that is used to connect to the server or database, and a password parameter that identifies a password that is used to connect to the server or database.

12. The computer-implemented method of claim 11, wherein the content of the keystore further comprises at least one of: one or more cryptographic keys, or one or more cryptographic certificates.

13. The computer-implemented method of claim 11, wherein the keystore identity parameters comprise an application stripe name that uniquely identifies the software application component, and a keystore name that uniquely identifies the keystore.

14. The computer-implemented method of claim 13, wherein the type of repository comprises one of a file, a lightweight directory access protocol server, or a database.

15. The computer-implemented method of claim 14, wherein when the type of repository comprises a file, the repository connection parameters comprise a file system parameter that identifies a location of the file that stores the keystore, and a file path parameter that identifies a path of the file that stores the keystore;

wherein when the type of repository comprises a lightweight directory access protocol server, the repository connection parameters comprise a host name parameter that identifies a location of the lightweight directory access protocol server, a port parameter that identifies a port of the lightweight directory access protocol server, a user name parameter that identifies a user name that is used to connect to the lightweight directory access protocol server, and a password parameter that identifies a password that is used to connect to the lightweight directory access protocol server; and wherein when the type of repository comprises a database, the repository connection parameters comprise a host name parameter that identifies a location of the database, a port parameter that identifies a port of the database, a user name parameter that identifies a user name that is used to connect to the database, and a password parameter that identifies a password that is used to connect to the database.

16. A keystore management system, comprising:

a processor;

a memory configured to store one or more instructions;

a creating module configured to create a mapping of a plurality of keystore identity parameters to a plurality of keystore repository parameters, wherein the keystore identity parameters identify the keystore, wherein the keystore repository parameters identify a repository that stores the keystore, and wherein the keystore comprises a storage entity stored on the repository;

a storing module configured to store the mapping within a configuration file;

a receiving module configured to receive a request to access content of the keystore from a software application component, wherein the request comprises the keystore identity parameters;

a translation module configured to translate the keystore identity parameters into the keystore repository parameters based on the mapping stored within the configuration file;

a retrieving module configured to retrieve the content of the keystore from the keystore using the keystore repository parameters; and a sending module configured to send the content of the keystore to the software application component;

wherein the keystore repository parameters comprise a repository type parameter that identifies a type of the repository, and one or more repository connection parameters that identify information used to connect to the repository;

wherein the keystore repository parameters are different for each type of repository; and wherein when the type of repository comprises a server or database, the repository connection parameters comprise a host name parameter that identifies a location of the server or database, a port parameter that identifies a port of the server or database, a user name parameter that identifies a user name that is used to connect to the server or database, and a password parameter that identifies a password that is used to connect to the server or database.

17. The keystore management system of claim 16, wherein the content of the keystore further comprises at least one of: one or more cryptographic keys, or one or more cryptographic certificates.

18. The keystore management system of claim 16, wherein the keystore identity parameters comprises an application stripe name that uniquely identifies the software application component, and a keystore name that uniquely identifies the keystore.

19. The keystore management system of claim 18, wherein the type of repository comprises one of a file, a lightweight directory access protocol server, or a database.

20. The keystore management system of claim 19, wherein when the type of repository comprises a file, the repository connection parameters comprise a file system parameter that identifies a location of the file that stores the keystore, and a file path parameter that identifies a path of the file that stores the keystore;

wherein when the type of repository comprises a lightweight directory access protocol server, the repository connection parameters comprise a host name parameter that identifies a location of the lightweight directory access protocol server, a port parameter that identifies a port of the lightweight directory access protocol server, a user name parameter that identifies a user name that is used to connect to the lightweight directory access protocol server, and a password parameter that identifies a password that is used to connect to the lightweight directory access protocol server; and wherein when the type of repository comprises a database, the repository connection parameters comprise a host name parameter that identifies a location of the database, a port parameter that identifies a port of the database, a user name parameter that identifies a user name that is used to connect to the database, and a password parameter that identifies a password that is used to connect to the database.

* * * * *

UNITED STATES PATENT AND TRADEMARK OFFICE
CERTIFICATE OF CORRECTION

PATENT NO.       : 8,761,399 B2           Page 1 of 1
APPLICATION NO.  : 13/655535
DATED            : June 24, 2014
INVENTOR(S)      : Agarwal et al.

It is certified that error appears in the above-identified patent and that said Letters Patent is hereby corrected as shown below:

In the Specification

Column 9, line 30, delete "psuedocode" and insert -- pseudocode --, therefor.

Column 9, line 57, delete "psuedocode" and insert -- pseudocode --, therefor.

Column 10, line 26, delete "()" and insert -- (); --, therefor.

Column 10, line 33, delete "psuedocode" and insert -- pseudocode --, therefor.

Column 10, line 52, delete "psuedocode" and insert -- pseudocode --, therefor.

Signed and Sealed this
Twenty-fourth Day of February, 2015

Michelle K. Lee
*Deputy Director of the United States Patent and Trademark Office*